(12) United States Patent
Velasquez

(10) Patent No.: US 7,325,513 B1
(45) Date of Patent: Feb. 5, 2008

(54) ANIMAL TRAILER WITH CORRAL PANELS SYSTEM

(75) Inventor: David P. Velasquez, Layton, UT (US)

(73) Assignee: David Paul Valesquez, Layton, UT (US)

( * ) Notice: Subject to any disclaimer, the term of this patent is extended or adjusted under 35 U.S.C. 154(b) by 361 days.

(21) Appl. No.: 11/187,664

(22) Filed: Jul. 22, 2005

(51) Int. Cl.
*B60P 3/04* (2006.01)
*A01K 1/00* (2006.01)
*A01K 3/00* (2006.01)

(52) U.S. Cl. ...................... 119/400; 119/512

(58) Field of Classification Search ............... 119/412, 119/415, 513, 512, 400; 248/225.11, 227.2
See application file for complete search history.

(56) References Cited

U.S. PATENT DOCUMENTS

| 3,726,256 | A | 4/1973 | Bernhardt et al. | 119/20 |
|---|---|---|---|---|
| 3,921,585 | A | 11/1975 | Hall | 119/20 |
| 4,537,151 | A | 8/1985 | Bolton | 119/20 |
| 5,381,757 | A | 1/1995 | Putney | 119/20 |
| 6,450,124 | B1 * | 9/2002 | Calvert et al. | 119/512 |
| 6,467,433 | B1 | 10/2002 | Stanton et al. | 119/512 |
| 6,499,435 | B2 | 12/2002 | Markham | 119/512 |
| 6,725,808 | B2 | 4/2004 | Campbell et al. | 119/513 |
| 6,729,267 | B2 | 5/2004 | Campbell | 119/513 |
| 6,854,426 | B2 | 2/2005 | Campbell et al. | 119/513 |
| 2002/0139315 | A1 | 10/2002 | Calvert et al. | 119/512 |
| 2002/0148411 | A1 | 10/2002 | Markham | 119/512 |
| 2003/0209206 | A1 * | 11/2003 | Campbell | 119/513 |
| 2003/0209207 | A1 | 11/2003 | Campbell et al. | 119/513 |

\* cited by examiner

*Primary Examiner*—Teri Pham Luu
*Assistant Examiner*—Monica L Williams

(57) ABSTRACT

A animal trailer with corral panels system for efficiently transporting and retaining fence panels on a trailer. The animal trailer with corral panels system includes a trailer, a plurality of rear brackets, front brackets and supports. The trailer can be any general horse trailer used for transporting horses or other animals. A first rear bracket and a second rear bracket are mounted on the sides of the trailer, rearward of the trailer wheel wells. A first front bracket and second front bracket are similarly mounted forward of the trailer wheel wells spaced accordingly from the rear brackets in order to receive the fence panels. A rear support and a front support are additionally mounted to the sides of the trailer, utilized with straps to secure the fence panels to the trailer.

1 Claim, 8 Drawing Sheets

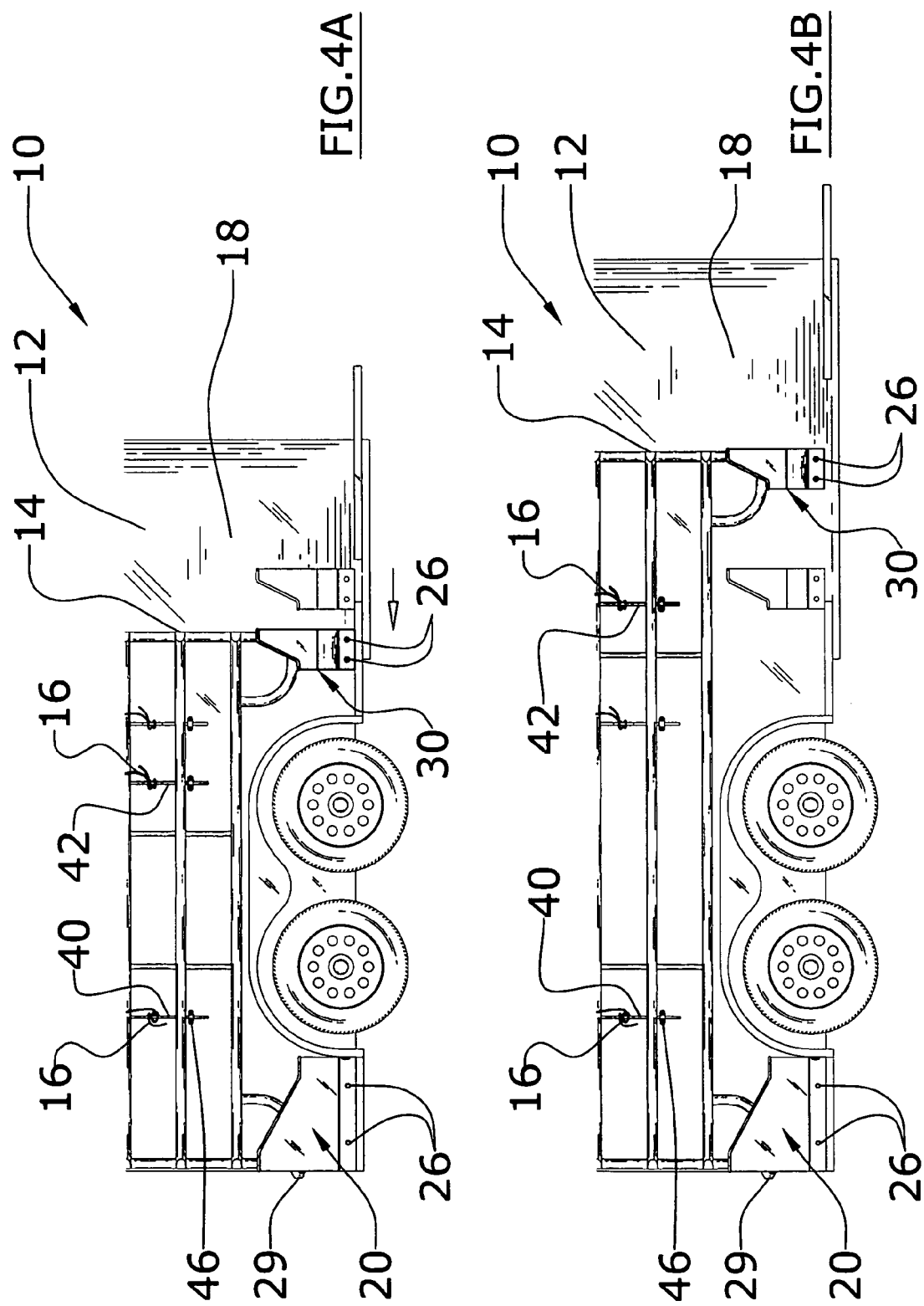

ANIMAL TRAILER WITH CORRAL PANELS SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to portable animal barriers and more specifically it relates to an animal trailer with corral panels system for efficiently transporting and retaining fence panels on a trailer.

2. Description of the Related Art

Any discussion of the prior art throughout the specification should in no way be considered as an admission that such prior art is widely known or forms part of common general knowledge in the field.

Portable animal barriers have been in use for years. Typically, livestock and other farm animals are transported to fairs, shows or other events in trailers. Fence panels or barriers used to contain the animals after reaching the site are sometimes required to be transported on the trailer. Unfortunately, transportable fence configurations currently used by ranchers and farmers are not securely retained to the trailer during travel, nor is there adjustment for varying fence panels lengths.

While these devices may be suitable for the particular purpose to which they address, they are not as suitable for efficiently transporting and retaining fence panels on a trailer. Current fence panel transport systems do not securely retain the fence panels to the trailers, nor do they adjust for varying lengths of the fence panels.

In these respects, the animal trailer with corral panels system according to the present invention substantially departs from the conventional concepts and designs of the prior art, and in so doing provides an apparatus primarily developed for the purpose of efficiently transporting and retaining fence panels on a trailer.

BRIEF SUMMARY OF THE INVENTION

In view of the foregoing disadvantages inherent in the known types of portable animal barriers now present in the prior art, the present invention provides a new animal trailer with corral panels system construction wherein the same can be utilized for efficiently transporting and retaining fence panels on a trailer.

The general purpose of the present invention, which will be described subsequently in greater detail, is to provide a new animal trailer with corral panels system that has many of the advantages of the portable animal barriers mentioned heretofore and many novel features that result in a new animal trailer with corral panels system which is not anticipated, rendered obvious, suggested, or even implied by any of the prior art portable animal barriers, either alone or in any combination thereof.

To attain this, the present invention generally comprises a trailer, a plurality of rear brackets, front brackets and supports. The trailer can be any general horse trailer used for transporting horses or other animals. A first rear bracket and a second rear bracket are mounted on the sides of the trailer, rearward of the trailer wheel wells. A first front bracket and second front bracket are similarly mounted forward of the trailer wheel wells spaced accordingly from the rear brackets in order to receive the fence panels. A rear support and a front support are additionally mounted to the sides of the trailer, utilized with straps to secure the fence panels to the trailer.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an animal trailer with corral panels system that will overcome the shortcomings of the prior art devices.

A second object is to provide an animal trailer with corral panels system for efficiently transporting and retaining fence panels on a trailer.

Another object is to provide an animal trailer with corral panels system that is easily assembled and disassembled.

An additional object is to provide an animal trailer with corral panels system that adjusts for varying sizes of fence panels.

A further object is to provide an animal trailer with corral panels system that allows for a plurality of corral configurations.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4A is a side view of the present invention shown with the first front bracket positioned for a shorter fence panel.

FIG. 4B is a side view of the present invention shown with the first front bracket positioned for a longer fence panel.

DETAILED DESCRIPTION OF THE INVENTION

A. Overview

Figure 1:
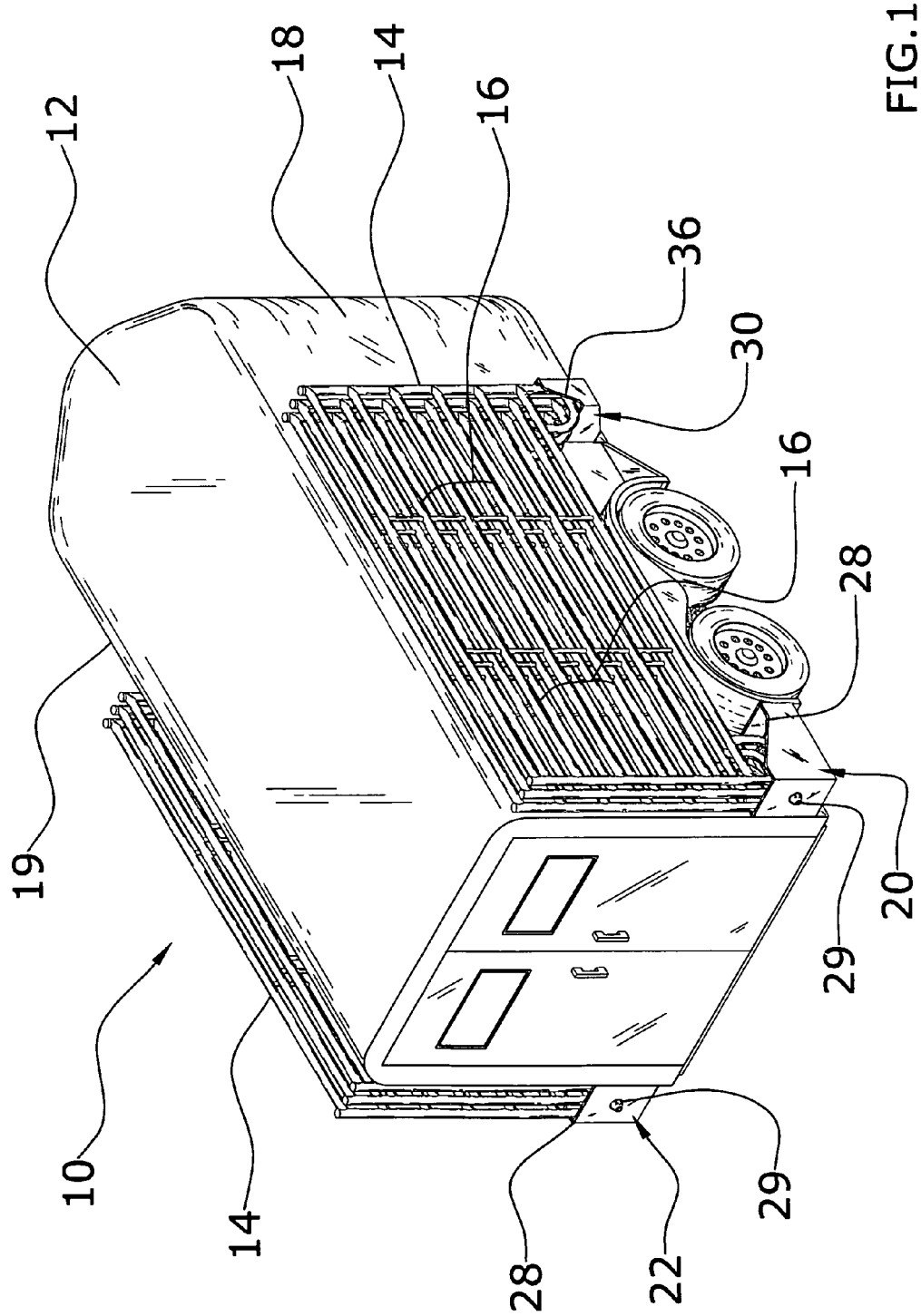
FIG. 1 is an upper perspective view of the present invention.

Turning now descriptively to the drawings, in which similar reference characters denote similar elements throughout the several views, FIGS. 1 through 8 illustrate a animal trailer with corral panels system 10, which comprises a trailer 12, a plurality of rear brackets 20, 22, front brackets 30, 32 and supports 40, 42. The trailer 12 can be any general horse trailer 12 used for transporting horses or other animals. A first rear bracket 20 and a second rear bracket 22 are mounted on the sides 18, 19 of the trailer 12, rearward of the trailer 12 wheel wells. A first front bracket 30 and second front bracket 32 are similarly mounted forward of the trailer 12 wheel wells spaced accordingly from the rear brackets 20, 22 in order to receive fence panels 14. A rear support 40 and a front support 42 are additionally mounted to the sides 18, 19 of the trailer 12, utilized with straps 16 to secure the fence panels 14 to the trailer 12.

B. Trailer

Figure 2:
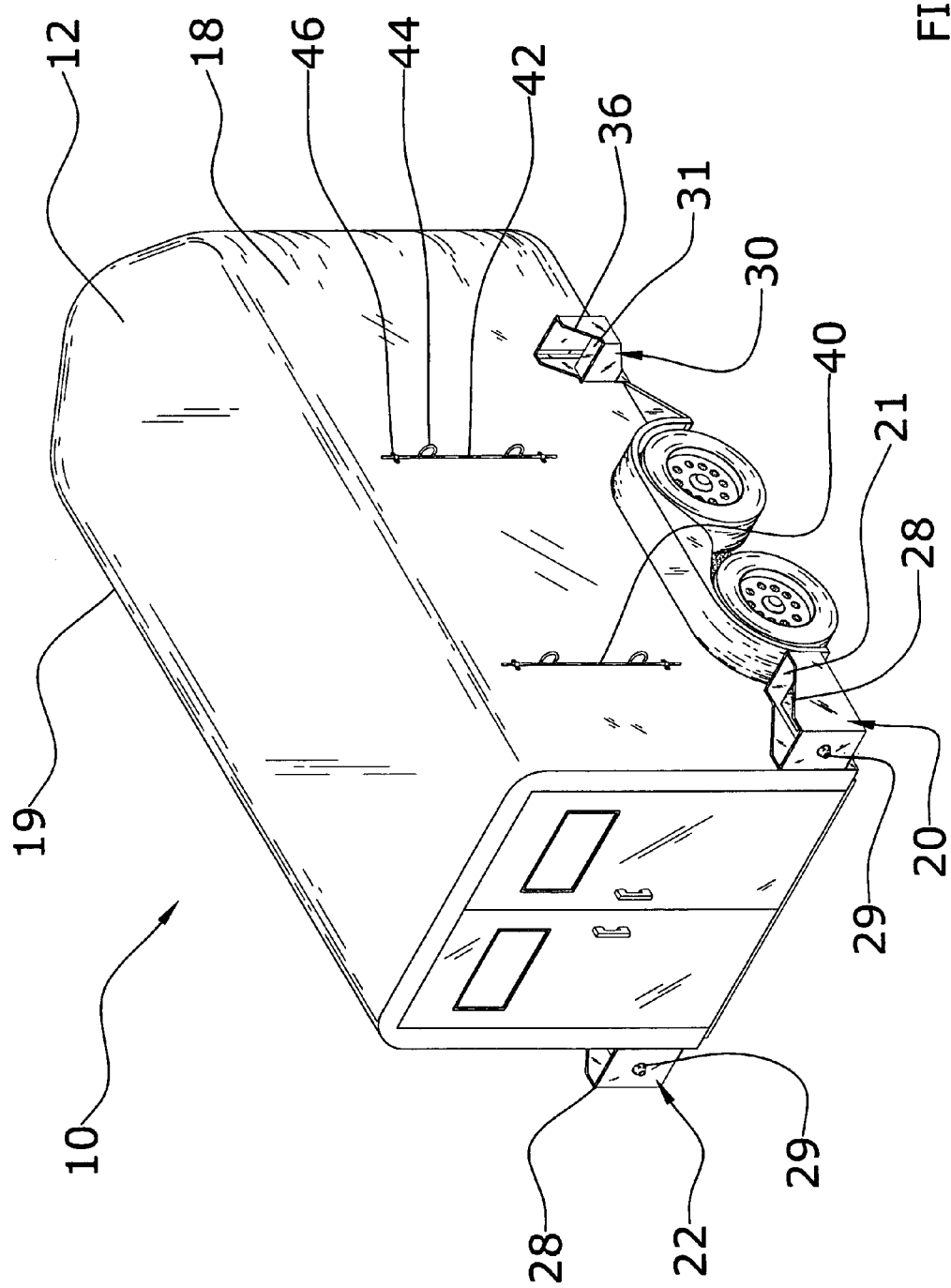
FIG. 2 is an upper perspective view of the present invention without fence panels.
Figure 3:
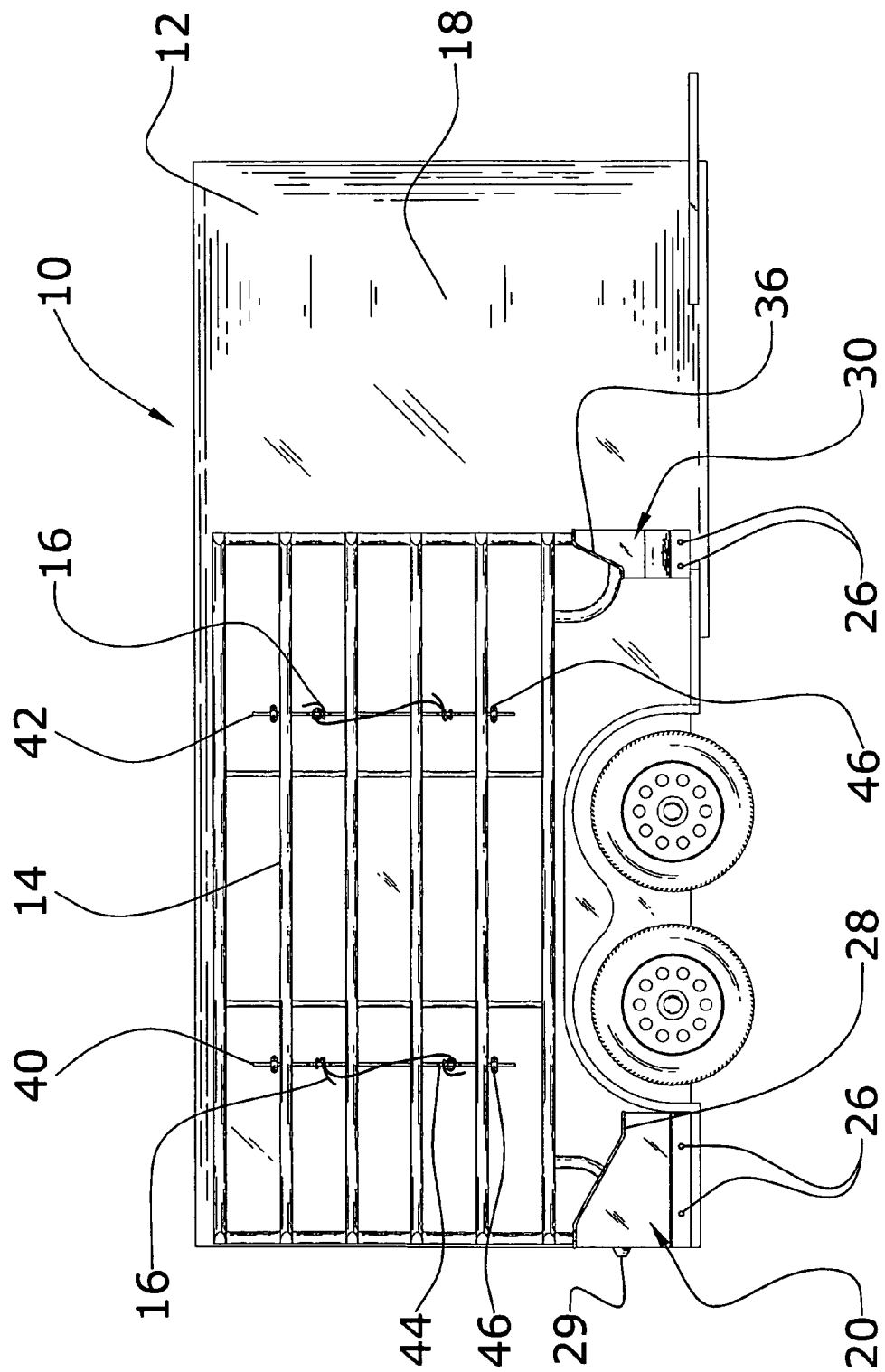
FIG. 3 is a side view of the present invention.

The trailer 12 is preferably a commercially available horse or livestock trailer configured to be pulled by a vehicle as shown best in FIGS. 1 through 3. The trailer 12 can be comprised of many different materials, but preferably it is constructed of a metal material resistant to rusting and corrosion. The trailer 12 lower structure is preferably not only rigid enough to withstand the combined mounted weight of the rear brackets 20, 22, front brackets 30, 32 and fence panels 14, but also the combined dynamic load caused by roading conditions.

C. Front and Rear Brackets

The rear brackets 20, 22 and front brackets 30, 32 are preferably made of a rigid material that will not significantly distort when welded to or while supporting the weight of the fence panels 14 and the contents the brackets 20, 22, 30, 32 may additionally contain (e.g. chains or straps). The brackets 20, 22, 30, 32 are preferably made of a material which will withstand contact with road salt and long exposure to moisture and humidity such that it will not rust or absorb water. The brackets 20, 22, 30, 32 may additionally be coated with a finishing material which must withstand contact with road salt and long exposure to moisture and humidity. The brackets 20, 22, 30, 32 preferably are metal, however, are not restricted from being molded in a plastic or a composite material.

As shown in FIGS. 1 through 4B and 6 through 8, the brackets 20, 22, 30, 32 are constructed with a metal frame work with sheet metal used to enclose the walls. However, it can be appreciated that other methods of construction (e.g. formed metal walls and welds) could be utilized to procure the brackets 20, 22, 30, 32. Although not shown, the second rear bracket 22 is a mirror image of the first rear bracket 20 as is the second front bracket 32 of the first front bracket 30.

Figure 6:
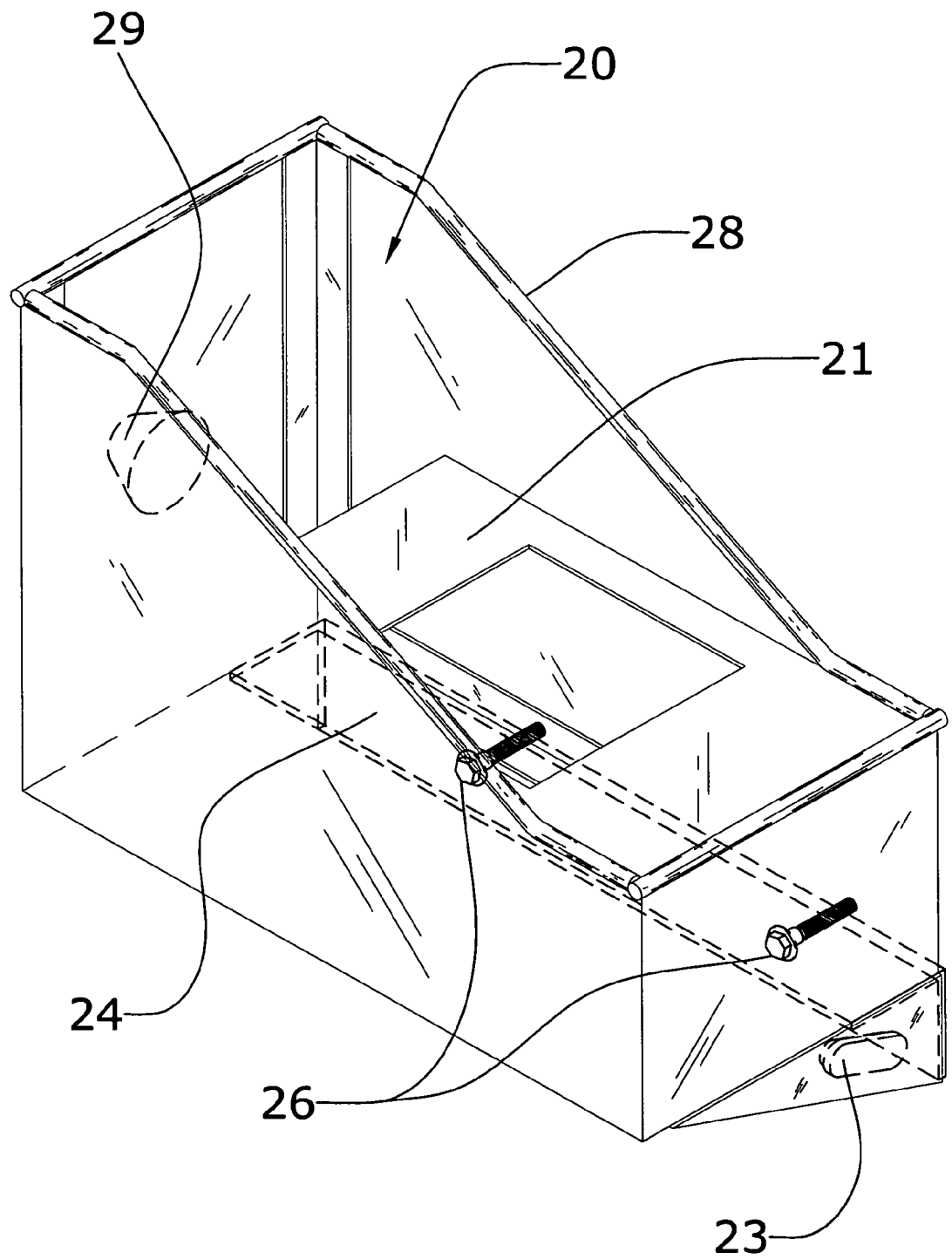
FIG. 6 is an upper perspective view of the first rear bracket showing fasteners, reflector and door stop.
Figure 7:
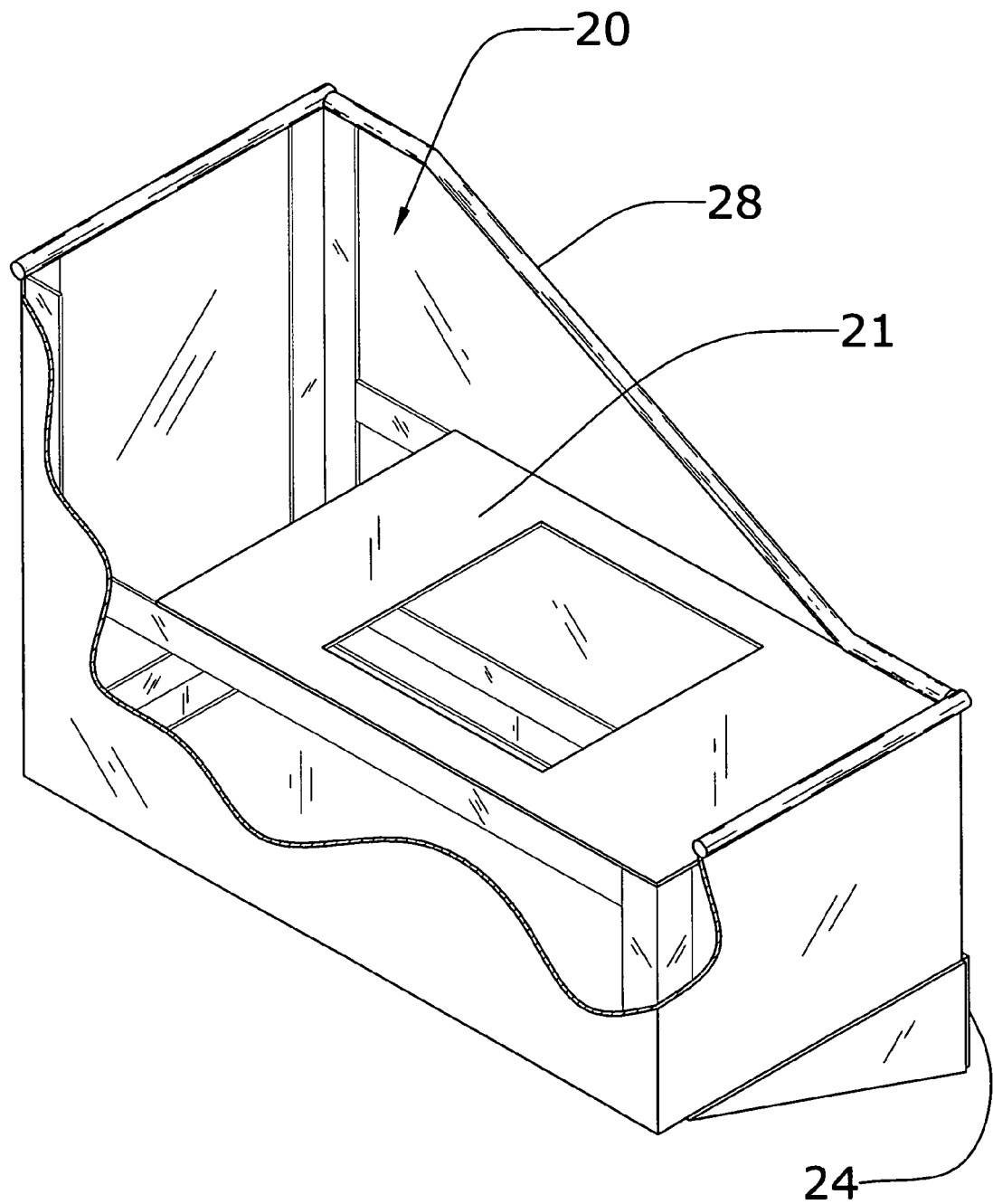
FIG. 7 is an upper perspective view with a cut-out section of a rear bracket showing bracket structure and first plate.

The first rear bracket 20 and the second rear bracket 22 each have a first plate 21 attached within as shown in FIGS. 2, 6 and 7. The first plate 21 is preferably welded to the rear brackets 20, 22, but other methods of attachment (e.g. fasteners) can be appreciated. As shown in FIGS. 6 and 7, the first plate 21 has an opening within it and is positioned within the rear brackets 20, 22 to allow for clearance of an inserted fence panel 14 as shown in FIGS. 1, 3 through 4B.

The rear brackets 20, 22 additionally have a first rod 28 extending around the top perimeter as shown in FIGS. 1 through 4B, 6 and 7. The first rods 28 are preferably welded to each bracket 20, 22 however, it can be appreciated that other attachment methods could be utilized. The purpose of the first rod 28 is to provide a protected edge for the rear brackets 20, 22. It can also be appreciated by one skilled in the art that other methods of protecting the edges (e.g. molded vinyl) can also be used.

As shown in FIGS. 1 through 4B, 6 and 7, the first rear bracket 20 and the second rear bracket 22 each have a door stop 29 located on the rear surface to protect the trailer 12 doors when swung open. The door stops 29 are preferably a rubber bumper style, but it can be appreciated that many different forms of door stops 29 are available. As shown in FIG. 6, located on the first rear bracket 20 and the second rear bracket 22 is a reflector 23. The reflector 23 is located on bottom portion of the rear brackets 20, 22 and is used to meet standard road requirements for trailers 12. Again, it can be appreciated that many styles and forms of reflectors 23 are available.

As shown in FIGS. 4A, 4B, 6 and 7, the first and second rear brackets 20, 22 each have a first mounting member 24 attached to the lower surface of the rear brackets 20, 22. The first mounting member 24 is preferably welded to the rear brackets 20, 22, but it can be appreciated that other methods (e.g. fasteners) could be utilized. As also shown in FIGS. 4A, 4B, 6 and 7, fasteners 26 are attached, preferably welded, protruding through the first mounting member 24. Used for mounting the rear brackets 20, 22 to the trailer, the fasteners 26, are placed through prepared apertures in the trailer 12 frame with additional hardware (e.g. washer and nut) securing the rear brackets 20, 22 to the trailer.

Figure 8:
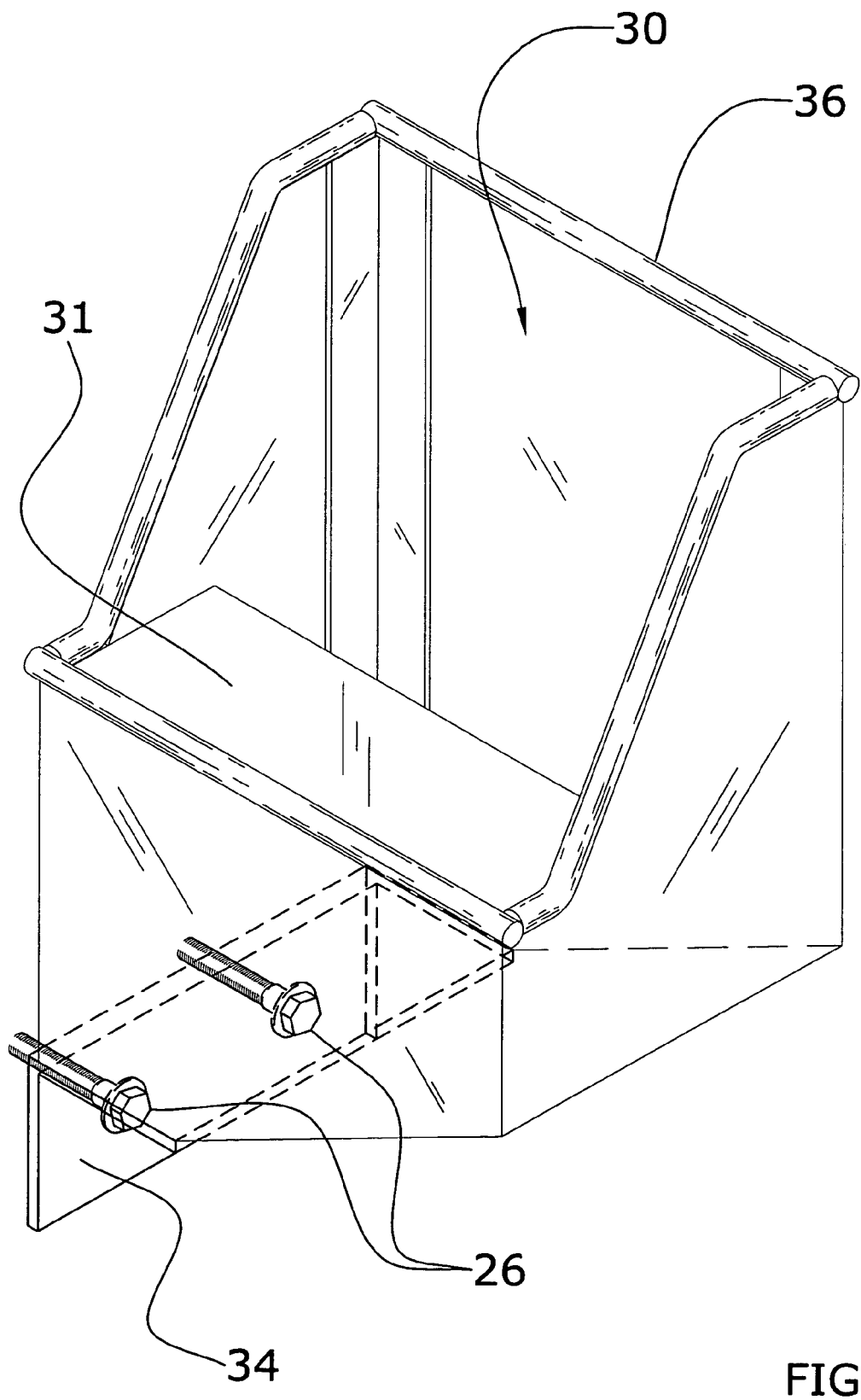
FIG. 8 is an upper perspective view of the first front bracket showing fasteners and second plate.

The first front bracket 30 and the second front bracket 32 each have a second plate 31 attached within as shown in FIGS. 2 and 8. The second plate 31 is preferably welded to the front brackets 30, 32, but other methods of attachment (e.g. fasteners) can be appreciated. As shown in FIGS. 2 and 8, the second plate 31 is positioned within the front brackets 30, 32 allowing for clearance of an inserted fence panel 14 as shown in FIGS. 1, 3 through 4B.

The front brackets 30, 32 additionally have a second rod 36 extending around the top perimeter as shown in FIGS. 1 through 4B and 8. The second rods 36 are preferably welded to each bracket 30, 32 however, it can be appreciated that other attachment methods could be utilized. The purpose of the second rod 36 is to provide a protected edge for the front brackets 30, 32. It can also be appreciated by one skilled in the art that other methods of protecting the edges (e.g. molded vinyl) can also be used.

As shown in FIGS. 4A, 4B and 8, the first and second front brackets 30, 32 each have a second mounting member 34 attached to the lower surface of the front brackets 30, 32. The second mounting member 34 is preferably welded to the front brackets 30, 32, but it can be appreciated that other methods (e.g. fasteners) could be utilized. As also shown in FIGS. 4A, 4B and 8, fasteners 26 are attached, preferably welded, protruding through the second mounting member 34. Used for mounting the front brackets 30, 32 to the trailer, the fasteners 26, are placed through prepared apertures in the trailer 12 frame with additional hardware (e.g. washer and nut) securing the front brackets 30, 32 to the trailer.

D. Supports

The rear support 40 and front support 42 are preferably made of a rigid material that will not significantly distort when welded to or while being strapped to the fence panels 14. The supports 40, 42 are preferably made of a material which will withstand contact with road salt and long exposure to moisture and humidity such that it will not rust. The rear support 40 and front support 42 may additionally be coated with a finishing material which must withstand contact with road salt and long exposure to moisture and humidity. The supports 40, 42 are preferably made of metal rod with a circular cross section, but it can be appreciated that other materials or cross sections could be used.

Figures 5A, 5B:
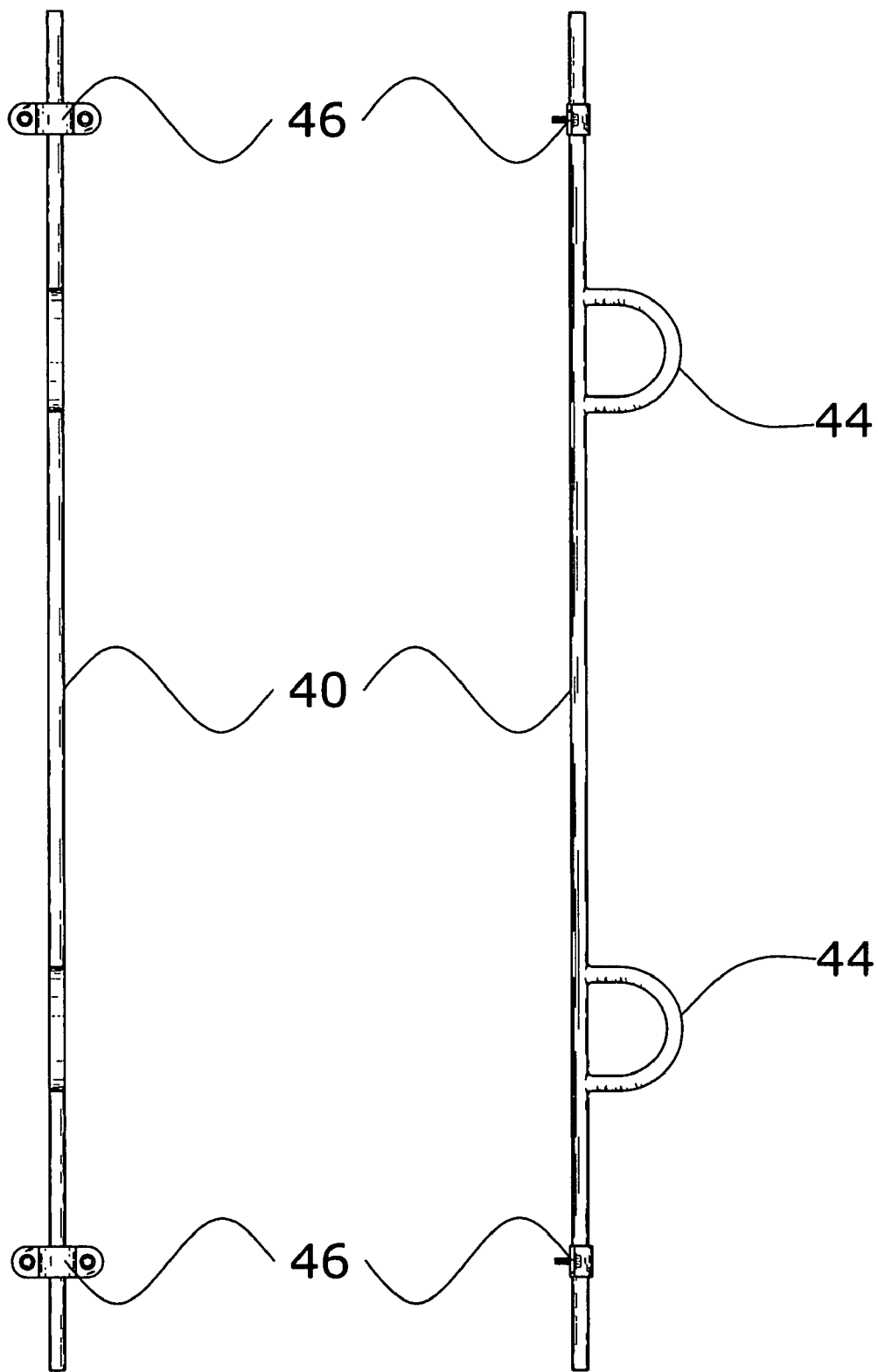
FIG. 5A is a front view of a support with clamps.
FIG. 5B is a side view of a support with clamps.

As best shown in FIGS. 5A and 5B, the supports 40, 42 are preferably straight with two U-shaped loops 44 attached along the length of the supports 40, 42. The loops 44 are preferably welded to the supports 40, 42, but it can be appreciated the other methods of creating the loop 44 features (e.g. forming) are possible. The loops 44 are preferably attached to the supports 40, 42 substantially in line, so when attached to the trailer 12, the loops project in the same direction. The loops 44 are preferably spaced apart on the supports such that when strapping to the fence panels 14, amble leverage is obtained to secure the fence panels 14.

As illustrated in FIGS. 2 through 4B, clamps 46 are used to secure the rear support 40 and front support 42 to the first side 18 and second side 19 of the trailer 12. The clamps 46 are located at the ends of the supports 40, 42 fastened to the trailer 12 with standard fasteners. It can be appreciated by one skilled in the art that alternative methods of attachment could be utilized.

E. Operation of the Invention

In use, the animal trailer with corral panels system 10 is preferably used for transporting horses or other animals to fairs and other events. The animal trailer with corral panels 10 is preferably transported by being pulled by a pick-up truck or similar vehicle utilizing a common standard hitch and ball assembly. As shown in FIGS. 1 through 4B, a trailer 12 configured with the rear brackets 20, 22, front brackets 30, 32 and supports 40, 42 is preferably capable of transporting five fence panels 14 on the first side 18 and five fence panels 14 on the second side 19. However, it can be appreciated that varying numbers of fence panels 14 could be place in the animal trailer with corral panels system 10. Straps 16 are utilized to secure the fence panels 14 to the supports 40, 42 located on the trailer 12, keeping the fence panels 14 within the wheel wells of the trailer 12 to meet road width restrictions.

The placement of the first and second rear brackets 20, 22 onto the trailer is the initial step in creating the animal trailer with corral panels system 10. As shown in FIGS. 1 through 4B, properly locating the rear brackets 20, 22 behind the wheel wells of each side 18, 19 of the trailer 12 is critical in how the fence panels will fit on the trailer 12. The rear brackets 20, 22 must be located so the fence panels 14 will not interfere with trailer 12 wheel wells when preparing for transportation of the animal trailer with corral panels system 10.

Positioning of the first and second front brackets 30, 32 is equally as important as the rear brackets 20, 22. The front brackets 30, 32 are preferably positioned on the sides 18, 19 of the trailer 12, vertically aligned with the rear brackets 20, 22 and also distanced forward of the rear brackets 20, 22 so the fence panels 14 will properly fit into the brackets 20, 22, 30, 32 as shown in FIGS. 1, 3 through 4B. As also shown in FIGS. 4A and 4B, the front brackets 30, 32 can be adjusted fore and aft on the trailer 12 to accommodate varying lengths of fence panels 14. To adjust the front brackets 30, 32, additional apertures can be installed in the trailer 12 at appropriate distances to accommodate varying length fence panels 14.

Positioning the rear supports 40 and front supports 42 on the sides 18, 19 of the trailer 12 is driven by the length and style of fence panel 14 being utilized. Once the fence panels 14 are placed in the brackets 20, 22, 30, 32 the vertical and horizontal cross members of the fence panels 14 will be set in place. As best shown in FIGS. 4A and 4B, after the position of the fence panel 14 cross members are determined, the supports 40, 42 can be fastened in place on the trailer 12 sides 18, 19 so the loops 44 on the supports 40, 42 will not interfere with the fence panel 14 cross members.

With the brackets 20, 22, 30, 32 and supports 40, 42 attached to the trailer and the fence panels 14 placed within the brackets 20, 22, 30, 32, the straps 16 (e.g. tie downs, chains . . . ) can be used to secure the fence panels 14, preparing the animal trailer with corral panels system 10 for transport. The straps 16 are preferably attached through the loops 44 of the supports 40, 42 and fastened around the fence panel 14 cross members to secure the fence panels 14 to the trailer 12 as shown in FIGS. 1, 3 through 4B.

After reaching the desired site with the animal trailer with corral panels system 10, the straps 16 can be unfastened from the fence panels 14 and the fence panels 14 removed. Once removed from the animal trailer with corral panels system 10, the fence panels 14 can be set-up in the desired configuration. The fence panels 14 can be set-up to create a corral attached or away from the trailer 12 or configured in a V-shape formation to the rear of the trailer 12 to herd the animals into the trailer 12. As can be appreciated, many fence panel 14 configurations can be utilized as desired. When prepared to leave the site, the fence panels 14 can be installed back into the brackets 20, 22, 30, 32 and secured to the supports 40, 42 on the trailer 12 with the straps 16, prepared again for transport.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An animal trailer in combination with corral panels comprising:

an animal trailer with a first side and a second side, two back doors, and front and rear wheels on either side;

a pair of rear brackets, each rear bracket positioned on a bottom portion of a side of said animal trailer and adjacent said rear wheels, each said rear bracket comprising:

a first rod member welded around a top perimeter of said rear bracket, a first plate member positioned horizontally within said rear bracket, with an aperture centered in said plate member to receive a plurality of said corral panels, a doorstop centered on a backside of said rear bracket for protection of said back doors when open, a first L-shaped mounting member attached to a lower surface of said rear bracket, said mounting member having fasteners protruding through said mounting member for mounting said rear bracket to said animal trailer;

said combination further comprising a pair of front brackets, each front bracket positioned on a bottom portion of a side of said animal trailer and adjacent said front wheels, each said front bracket comprising:

a second rod member welded around a top perimeter of said front bracket, a second plate member positioned horizontally within said front bracket, covering a portion of said front bracket and leaving an aperture to receive a plurality of said corral panels, a second L-shaped mounting member attached to a lower surface of said front brackets, said mounting member having fasteners protruding through said mounting member for mounting said front bracket to said animal trailer;

wherein said front brackets are vertically aligned with and positioned forward said rear brackets, wherein said rear brackets and said front brackets are positioned on either side of said wheels of said animal trailer, wherein said front brackets are distanced from said rear brackets, said distance is set to accept one of said corral panel, said combination further including a pair of supports attached to each side of said animal trailer, each said supports comprising:

a straight metal bar member and two U-shaped loops attached along the length of said support for passing straps through to secure said corral panels to said animal trailer, wherein said rear supports and said front supports are vertically aligned on a side of said animal trailer.

* * * * *